United States Patent [19]

Scragg

[11] Patent Number: 4,471,939
[45] Date of Patent: Sep. 18, 1984

[54] TIMER

[76] Inventor: Edgar P. Scragg, 60 Mulder Street, Florida Park Extn. 3, Florida, South Africa

[21] Appl. No.: 528,736

[22] Filed: Sep. 1, 1983

[51] Int. Cl.³ .................................. F16K 31/12
[52] U.S. Cl. ............................ 251/38; 137/636.4
[58] Field of Search .............. 251/21, 38, 45, 50; 137/636.4

[56] References Cited

U.S. PATENT DOCUMENTS

| | | | |
|---|---|---|---|
| 2,324,946 | 7/1943 | Molloy | 251/50 |
| 2,508,399 | 5/1950 | Kendrick | 251/50 |
| 2,988,110 | 6/1961 | Thomas | 251/50 |
| 2,991,796 | 7/1961 | Griswold | 251/50 |
| 3,236,253 | 2/1966 | Symmmons | 251/50 |
| 3,495,804 | 2/1970 | Muller | 251/45 |
| 4,003,548 | 1/1977 | Stradella | 251/45 |
| 4,022,380 | 5/1977 | Scragg | 251/38 |
| 4,204,557 | 5/1980 | Scragg | 251/45 |
| 4,241,759 | 12/1980 | Billeter | 251/38 |
| 4,285,361 | 8/1981 | Lissau | 251/21 |

Primary Examiner—Daniel J. O'Connor
Attorney, Agent, or Firm—Ladas & Parry

[57] ABSTRACT

A timer in which the re-filling of a control chamber (26) via its inlet (56) causes displacement of a resilient wall (34). A surface (62) of the wall (34) thus engages a valve seat (64) to shut-off the inlet (14) of the timer from its outlet (20). To open the timer a cap (88) is depressed. A stem (90) depending from the cap depresses an element (44) against the action of a spring (60). The element (44) is thus displaced to open the outlet bore (42) of the chamber (26). Water pressure in the casing (12) acting on the wall (34) then urges it in the direction which separates the surface (62) from the seat (64). A series of stop surfaces (86) co-operate with a stop element (100) of the cap (88). The surfaces (86) are at different heights. The distance through which the cap (88) can be depressed is varied by rotating it so that the element (100) co-operates with a selected surface (86).

10 Claims, 4 Drawing Figures

TIMER

This invention relates to timers.

BACKGROUND OF THE INVENTION

In a number of fields of technology it is desirable to be able to provide a flow of water (or other liquid) for a predetermined but adjustable period of time. For example, in garden and other irrigation systems it is desirable to provide a timer which permits flow for a certain period and then closes a shut-off valve. Another use of timers is in conjunction with semi-automatic dishwashing machines which are becoming more popular. In such machines water pressure is used to rotate a rack, and water sprays clean the dishes on the rack. The time for which the washer is run depends on the type of dishes being washed i.e. cups and saucers require a short time and greasy plates a longer time. An adjustable timer has great utility in conjunction with such machines.

Conventionally, timers incorporate a clock-work mechanism which is wound up or, in more sophisticated forms, electrical or electronic systems. These later forms require a power source, which it is not always convenient to provide.

OBJECTS OF THE PRESENT INVENTION

The main object of the present invention is to provide a timer for incorporation into a liquid flow path, which timer is devoid of clockwork mechanisms, electronic or electrical circuits and power sources, and which shut-off the flow path after a pre-selected period of time.

Another object of the present invention is to provide a timer which is incorporated into a push-button tap and which holds the tap open for a pre-selected period of time.

BRIEF DESCRIPTION OF THE INVENTION

According to the present invention there is provided a timer comprising a body, a liquid inlet to the body, a liquid outlet from the body, a control chamber having a movable wall part, a restricted inlet connecting the interior of the control chamber to said liquid inlet, an outlet from the control chamber, a closure element normally engaged with a valve seat to close said outlet from the control chamber, an operating member which is both rotatable and displaceable linearly, linear displacement of the operating member serving to unseat said closure element thereby to open the outlet from the control chamber, a main valve seat and co-operating sealing surface, said main valve seat and surface moving apart when said closure element is unseated thereby permitting the movable wall part to be displaced by pressure externally thereof, a series of staggered stop surfaces arranged in a circular array, and a stop element forming part of said operating member and co-operating with said stop surfaces, the position to which the operating member has been rotated determining which stop surface of said series of stop surfaces the stop element engages when said operating member is displaced linearly.

To minimise the possibility of the user inadvertantly rotating the control member while displacing it linearly, there can be ribs between stop surfaces, said ribs inhibiting rotation of said control member while said stop element is between any adjacent pair of ribs.

Means can be provided for restricting linear displacement of the control member in the direction away from said stop surfaces.

To prevent the control member from rotating through more than 360°, one of the ribs can lie in the path of said stop element when the control member is at its maximum displacement from said stop surfaces.

In a specific constructional form, said control member is in the form of a cap having a depending skirt and a depending central stem, said stem engaging said closure element and said stop element lying between said skirt and said stem. In this form there is additionally a plug member, said stop surfaces encircling an aperture in said plug member and said plug member being secured to said body and closing an opening in said body, said stem passing through said aperture. The means for restricting linear displacement of the control member can comprises a head on a part of said stem which projects into the interior of said body through said aperture.

It is preferred that said body include a dome-like portion with said water inlet in the side wall thereof, there being an opening in the centre of the top wall of the dome-like portion which opening is encircled by said main valve seat, said control chamber being in the body below the said opening and the dome-like portion being extended upwardly above said opening by a spigot, said liquid outlet being in the side wall of said spigot and said stop surfaces being on a plug member which closes the upper end of said spigot, said control member being in the form of a cap which surmounts the plug member and which includes a stem which passes downwardly through said plug member into said spigot to co-operate with said closure element part of which lies in said spigot.

BRIEF DESCRIPTION OF THE DRAWINGS

For a better understanding of the present invention, and to show how the same may be carried into effect, reference will now be made, by way of example, to the accompanying drawings in which.

Figure 1:
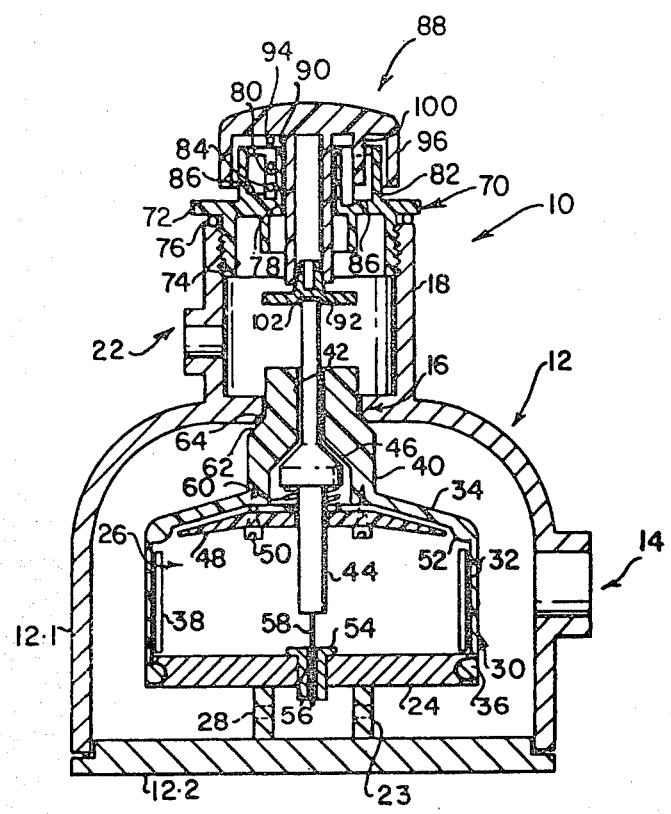
FIG. 1 is a vertical section through a timer.

Referring firstly to FIG. 1, the timer illustrated is generally designated 10 and comprises body 12 consisting of two portions 12.1 and 12.2 that are screwed or otherwise secured together. The body portion 12.1 is dome-like with a water inlet 14 in a side wall thereof and an opening 16 centrally located in the top wall thereof. A spigot 18 extends the body portion 12.1 upwardly and a liquid outlet 22 is provided in the side wall of the spigot.

A ring 23 upstanding from the body portion 12.2 carries a disc 24 constituting the fixed wall of a control chamber 26. The ring 23 has a series of apertures 28 therein.

An inverted, resilient cup 30 of synthetic plastics material comprises a cylindrical wall 32 and a frusto-conical wall 34. Internally of the wall 32, and at the end thereof remote from the wall 34, there is a bead 36 which is received in a peripheral groove of the disc 24. Internally of the wall 32 there is a sleeve 38 of relatively rigid material which prevents inward collapse of the wall 32 under pressure.

A spigot 40 stepped both internally and externally protrudes from the centre of the wall 34. The bore 42 through the spigot 40 forms the outlet from the chamber 26. A valve closure element 44 passes through the bore 42 and co-operates with a seat 46 formed by the internal step of the spigot 40.

A frusto-conical disc 48 is secured by screws 50 to the spigot 40 and lies within the chamber 26 adjacent the inner face of the wall 34. A strengthening bead 52 encircles the cup 30 internally in the region where the walls 32 and 34 merge.

The disc 24 has a central aperture and a jet 54 is a push-fit in this aperture. The jet 54 has a fine metering bore 56 therein, a cleansing needle 58 carried by the member 44 moving in the bore 56. The annular gap between the needle 58 and the bore 56 forms a restricted inlet which places the interior of the control chamber in communication with the inlet 14.

A spring 60 is provided between the enlarged part of the element 44 and the disc 48 and urges the element 44 against the seat 46.

The external step of the spigot 40 provides a frusto-conical sealing surface 62 which co-operates with a main valve seat 64 of the body portion 12.1, the seat 64 encircling the opening 16.

The upper end of the spigot 18 is closed by a plug member generally designated 70. The plug member 70 includes a disc-like portion 72 from which depends an externally threaded spigot 74. The spigot 18 is internally threaded so that the plug member 70, with the interposition of a sealing ring 76, can be screwed onto the spigot 18.

The disc-like portion 72 has a central aperture 78 therein and a guide sleeve 80 co-axial with the aperture 78 protrudes upwardly from the portion 72. Spaced radially outwardly from and encircling the sleeve 80 is an upstanding circumferentially extending wall 82 of constant height.

Between the sleeve 80 and the wall 82 there is a plurality of radial ribs 84. Each rib 84 has its radially outer end integral with the wall 82 and its radially inner end spaced from the sleeve 80. Between each pair of adjacent ribs 84 there is a top surface 86. As will be seen from FIG. 3, the stop surfaces 86 are staggered, that is, they are at different heights. The stop surface 86.1 is longer, measured circumferentially, that the remainder and is in addition at substantially the same level as the upper edge of the wall 82. The stop surfaces 86 are arranged in a circular array encircling the aperture 78.

A control member in the form of a cap 88 surmounts the plug member 70, the cap 88 having a stem 90 which passes downwardly through the guide sleeve 80 and the aperture 78. A head 92 on the stem 90 limits upward movement of the cap 88 away from the stop surfaces 86 under the influence of a return spring 94 which acts between the underside of the cap 88 and the disc-like portion 72. The spring 94 lies in the cylindrical space between the ribs 84 and the sleeve 80.

The cap 88 further includes a depending skirt 96 which has a mark at one place on the periphery thereof. The mark can be replaced by a protruding indicator finger.

Also depending from the main part of the cap is a stop element 100 which is aligned with the series of stop surfaces 86, the stop element lying between the skirt 96 and the stem 90. The step 86.1 is of sufficient height to lie in the path of the lower end of the stop element even when the cap is in its uppermost position, that is, at maximum displacement from the stop surfaces 86. Consequently, the cap 88 is only free to rotate through somewhat less than 360°.

It will be noted that the lower end of the stem 90 is formed with a socket 102 which receives the upper end of the member 44.

Figure 2:
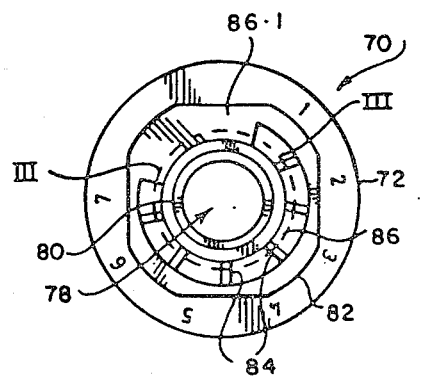
FIG. 2 is a top plan view of one component of the timer, FIG. 2 being to a larger scale.

From FIG. 2 it will be seen that the periphery of the disc-like portion 72 has inscribed thereon a series of numbers. These co-operate, as will described in more detail hereinafter, with the mark or finger of the cap 88.

In use, an inlet hose (not shown) is connected to the inlet 14, there being a suitable filter (not shown) for minimising the ingress of dirt particles into the body 12. A further hose (not shown) is connected to the outlet 20 and leads to, for example, one or more garden sprinklers.

While the control chamber 26 is full of water, the surface 62 is held against the valve seat 64 so that the outlet 16 is shut-off from the inlet 14. When the cap 88 is pressed downwardly against the action of the return spring 94, the element 44 is also displaced downwardly so that the element 44 and seat 46 separate. The pressure in the control chamber 26 thus drops and pressure in the body 12 acting on the wall 34 causes the spigot 40 to move downwardly. The surface 62 thus separates on the valve seat 64 and flow from the inlet 14 to the outlet 16, and hence to the sprinkler or sprinklers, commences. When the cap 88 is released, the spring 94 returns the cap 88 to its uppermost position and the spring 60 holds the element 44 against the seat 46. The outlet from the control chamber 26 is thus closed and water flows from the body 12 into the control chamber 26 by way of the annular gap between the surface of the bore 56 and the needle 58. By making this annular gap long and narrow it is possible to ensure that it takes, for example, two or three hours for the chamber 26 to fill completely.

As the chamber 26 fills, the wall 34 moves progressively towards the condition thereof illustrated in FIG. 1. Eventually the surface 62 engages the seat 64 and flow through the timer ceases.

It will be understood that, depending on the position of rotation of the cap 88, the stop element 100 will encounter a particular one of the stop surfaces 86. If the stop element 100 is above the lowermost stop surface 86, then the possible travel of the cap will be maximum. If the stop element 100 is above a higher stop surface then the travel of the cap 88 will be less.

The ribs 84 prevent rotation of the cap 88 as soon as the lower end of the stop element 100 is below the plane in which the upper edges of the ribs 84 lie. This eliminates the possibility that the user will inadvertantly rotate the cap 88 as he depresses it. Sufficient rotation of the cap 88 in the absence of the ribs 84 could cause a stop surface other than the intended one to be engaged by the element 100.

If the travel of the cap 88 is maximum then the downward displacement of the element 44 will also be maximum. Consequently, the spigot 40 must move down by a maximum extent before the seat 46 encounters the element 44 to close the outlet from the chamber 26. It follows from this that the amount of water displaced from the chamber 26 will also be the maximum possible. The time needed to re-fill the chamber 26, and hence the time for which the timer remains open, will also be long. Conversely, if the stop element 100 encounters a high stop surface then a smaller amount of water will be discharged from the control chamber 26 and the time needed to re-fill the control chamber and close the timer will be commensurately shorter.

The time for which water will flow through the timer for any particular setting depends on operating conditions such as pressure at the inlet 14 and back pressure at the hose connector 20. Thus, for example, a timer on setting 5 in one locality may stay open for a longer or shorter period than a timer set on 5 at another locality. It is for this reason that a simple series of numbers are inscribed on the portion 72 and not times. The user, by experience, will know approximately the time for which the sprinklers will run on any particular setting.

Figure 4:
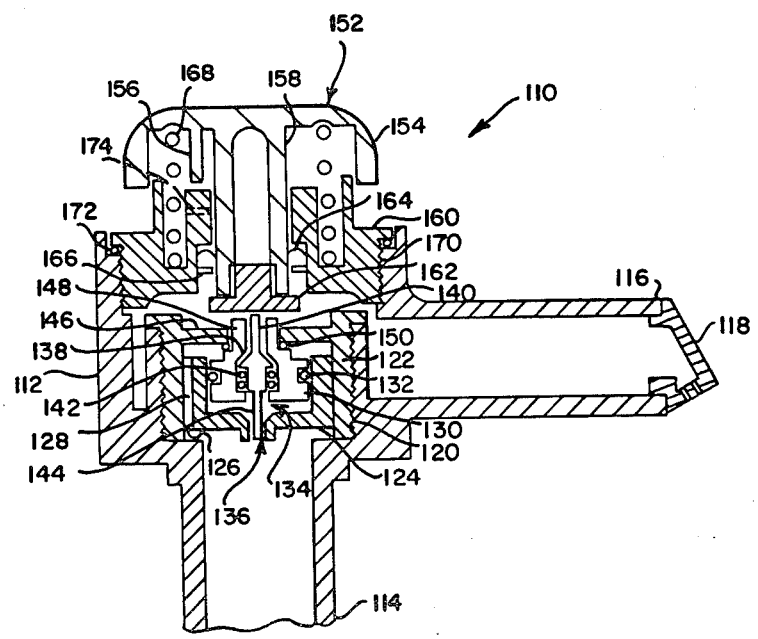
FIG. 4 is a section through a timer in the form of a push button tap.

Turning now to FIG. 4, this shows a timer which is in the form of a push button tap 110. The tap 110 comprises a body 112 of generally cylindrical form, there being a water inlet connection 114 extending downwardly from the body 112 and coaxial therewith, and an outlet spout leading laterally from the body 112. The free end of the spout 116 has a flow nozzle 118 inserted therein, the flow nozzle 118 creating the desired downward flow pattern from the spout 116.

The body 112 has an internally threaded bore 120, an externally threaded sleeve 112 being screwed into the bore 120. A cylinder 124 is a push fit in the bore of the sleeve 122.

There is at least one projection 126 on the end face of the cylinder 124, the projection 126 (or projections) co-operating with the annular end face of the bore 120 thereby to leave a flow path which places a passage 128 provided in the outer face of the cylinder 124 in communication with the inlet connection 114. Suitable sealing means (not shown) seal between the body 112 and the sleeve 122.

Within the cylinder 124 there is a piston designated 130, there being a sealing ring 132 between the piston 130 and the inner surface of the cylinder 124. The cylinder 124 and the piston 130 define a control chamber designated 134, there being a restricted inlet 136 to the control chamber 134.

The piston 130 has a bore therethrough, the bore being stepped so as to provide a seat 138 for a valve closure element 140. The valve closure element 140 protrudes in both directions from the bore in the piston 130 and is urged by a spring 142 against the seat 138. That portion of the closure element 140 which protrudes downwardly from the piston 130 is in the form of a cleaning needle 144. The needle 144 enters the inlet 136 and there is an annular gap between the outer face of the needle 144 and the face bounding the inlet 136.

The sleeve 122 is formed with a generally disc-like end wall 146, there being a central aperture in this end wall through which a spigot 148 forming part of the piston 130 protrudes. A sealing ring 150 encircles the spigot 148 and co-operates with the underface of the end wall 146.

The operating member of the tap 110 is in the form of a cap 152. The cap 152 has a depending skirt 154, a stop element 156 and a stem 158. The stem 158 passes through the bore of a body closure member 160 and a plug 162 is screwed into the internally threaded lower end of the stem 158. Between the stem 158 and the closure member 160 there is a U-packing 164 which is held in place by a ring 166. It will be noted that the maximum diameter of the head of the plug 162 exceeds the internal diameter of the ring 166, and thus limits movement of the cap 152 in the upward direction under the influence of a compression spring 168 which acts between the cap 152 and the body closure member 160.

The body closure member 160 is externally threaded at 170 and the body 112 carries corresponding threading whereby the entire assembly comprising the cap 152 and the body closure member 160 can be screwed into the body 112. A sealing ring 172 is provided between the body 112 and the body closure member 160.

Figure 3:
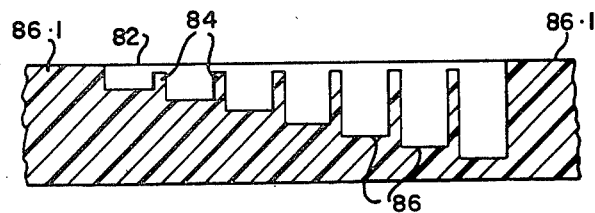
FIG. 3 is a developed section on the circular line III—III of FIG. 2.

The body closure member 160 has thereon a series of stop surfaces 174 and intervening ribs which are equivalent to the stop surfaces 86, 86.1 and ribs of the plug member 70 illustrated in FIGS. 1 to 3. The stop element 156 co-operates with the stop surfaces 174.

The spring 168 urges the cap 152 upwardly so that the periphery of the plug 162 engages the ring 166 which thus prevents further upward movement of the cap 152. The spring 142 holds the closure element 140 against its seat 138 in the bore of the piston 130, and water pressure within the control chamber 134 holds the piston 130 in its uppermost position with the ring 150 against the end wall 146. Co-operation between the ring 150 and the end wall 146 ensures that the inlet connection 114 is sealed-off from the spout 116.

In use, the cap 152 is rotated to bring the stop element 156 into co-operating relationship with the desired one of the stop surfaces 174, and the cap 152 is then pressed downwardly to the extent permitted by the stop element 156 engaging the selected one of the stop gap faces 174. The plug 152 thus bears on the closure element 140 and lifts it off its seat 138. The pressure in the control chamber 134 drops as water can now flow out through the part of the piston bore which is in the spigot 148, and water pressure on the external, upper face of the piston 130 urges the piston downwardly. This separates the ring 150 from the wall 146 and the tap thus opens. Water flows from the inlet connection 114 to the spout 116 via the passage 138 and the central aperture of the wall 146.

Downward movement of the piston 130 continues until the seat 138 encircling the bore of the piston 130 re-engages the closure element 140, this re-closing the outlet from the control chamber 134 so that the piston 130 then stops moving. It will be understood that the piston 130 completes its downward movement quickly and well within the time that the user normally holds the cap 152 depressed. It will further be understood that the distance through which the closure element 140 has been displaced depends on the setting of the cap 152, and that this distance consequently determines the quantity of water which flows from the control chamber before the outlet from the control chamber is re-closed. This in turn determines the time it takes to re-fill the control chamber. Once the outlet from the control chamber through the spigot 148 has been closed, water entering through the inlet 136 steadily fills the chamber 134 and forces the piston 130 upwardly. Eventually, the ring 150 re-engages the wall 146 and closes-off the inlet connection 114 from the spout 116.

I claim:

1. A timer comprising a body, liquid inlet to the body, a liquid outlet from the body, a control chamber having a movable wall part, a restricted inlet connecting the interior of the control chamber to said liquid inlet, an outlet from the control chamber, a closure element normally engaged with a valve seat to close said outlet from the control chamber, an operating member which is both rotatable and displaceable linearly, linear displacement of the operating member serving to unseat said closure element thereby to open the outlet from the control chamber, a main valve seat and co-operating sealing surface, said main valve seat and surface moving apart when said closure element is unseated thereby permitting the movable wall part to be displaced by pressure externally thereof, a series of staggered stop surfaces arranged in a circular array, and a stop element forming part of said operating member and co-operating with said stop surfaces, the position to which the operating member has been rotated determining which stop surface of said series of stop surfaces the stop element engages when said operating member is displaced linearly.

2. A timer according to claim 1, which there are ribs between stop surfaces, said ribs inhibiting rotation of said control member while said stop element is between any adjacent pair of ribs.

3. A timer according to claim 2, and including means for restricting linear displacement of the control member in the direction away from said stop surfaces.

4. A timer according to claim 3, and including a rib which lies in the path of said stop element when the control member is at its maximum displacement from said stop surface.

5. A timer according to claim 3 and including spring means for displacing said control member away from the stop surfaces.

6. A timer acccording to claim 5, wherein said control member is in the form of a cap having a depending skirt and a depending central stem, said stem serving to displace said closure element and said stop element lying between said skirt and said stem.

7. A timer according to claim 6, and including a plug member, said stop surfaces encircling an aperture in said plug member and said plug member being secured to said body and closing an opening in said body, said stem passing through said aperture.

8. A timer according to claim 7 in which said means for restricting linear displacement of the control member comprises a head on a part of said stem which projects into the interior of said body through said aperture.

9. A timer according to claim 1, in which said body includes a dome-like portion with said water inlet in the side wall thereof, there being an opening in the centre of the top wall of the dome-like portion which opening is encircled by said main valve seat, said control chamber being in the body below the said opening and the dome-like portion being extended upwardly above said opening by a spigot, said liquid outlet being in the side wall of said spigot and said stop surfaces being on plug member which closes the upper end of said spigot, said control member being in the form of a cap which surmounts the plug member and which includes a stem which passes downwardly through said plug member into said spigot to co-operate with said closure element part of which lies in said spigot.

10. A timer according to claim 1, in which said body is of generally cylindrical form having an inlet connection extending downwardly therefrom and an outlet spout extending laterally therefrom, said cap surmounting the body.

* * * * *